No. 714,016. Patented Nov. 18, 1902.
J. B. McMULLEN.
FRONT FOR VEHICLE TOPS.
(Application filed Apr. 9, 1902.)
(No Model.) 3 Sheets—Sheet 1.
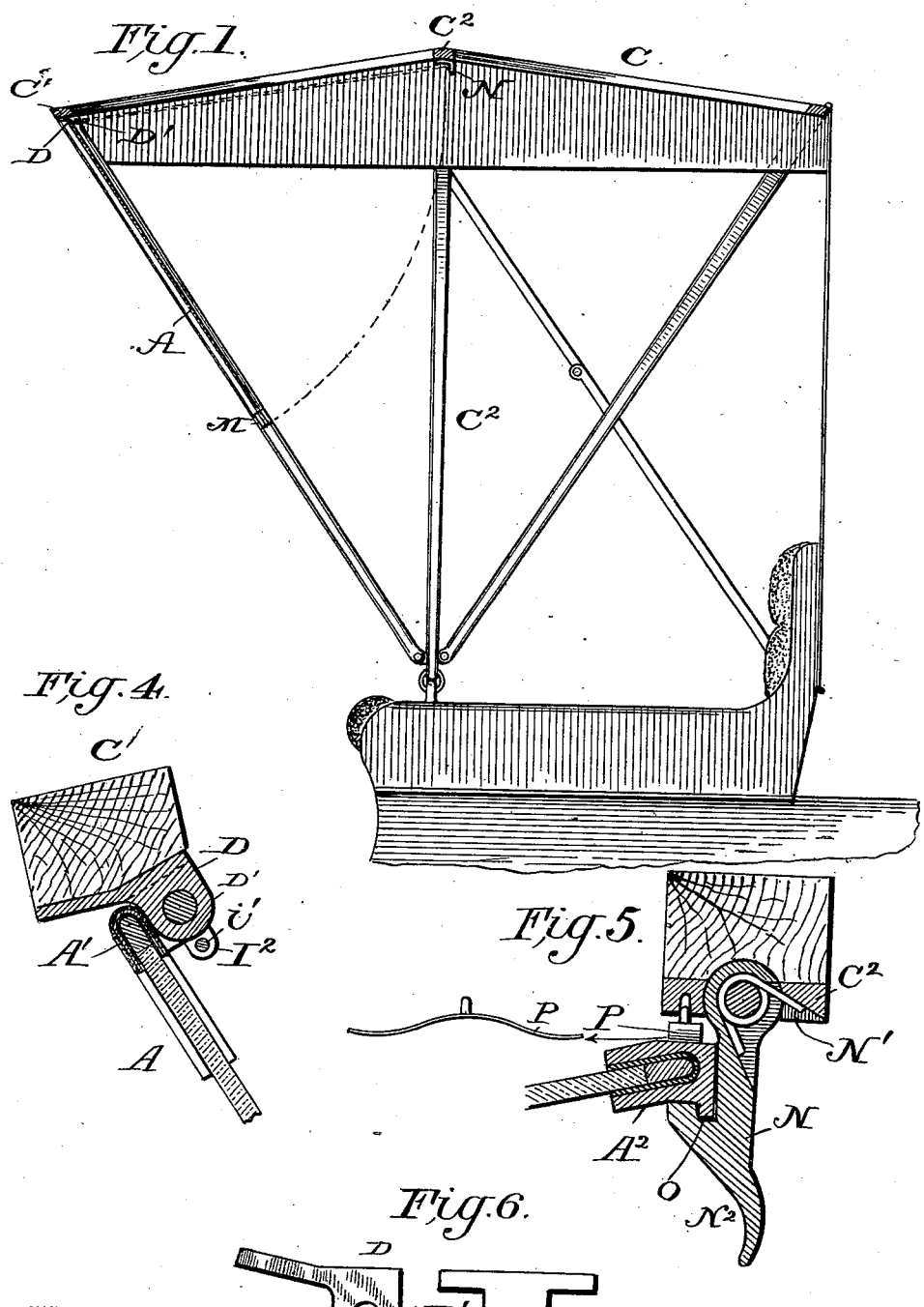
WITNESSES:
Jos. A. Ryan
Perry B. Turpin
INVENTOR
Joseph B. McMullen
BY Munn & Co.
ATTORNEYS

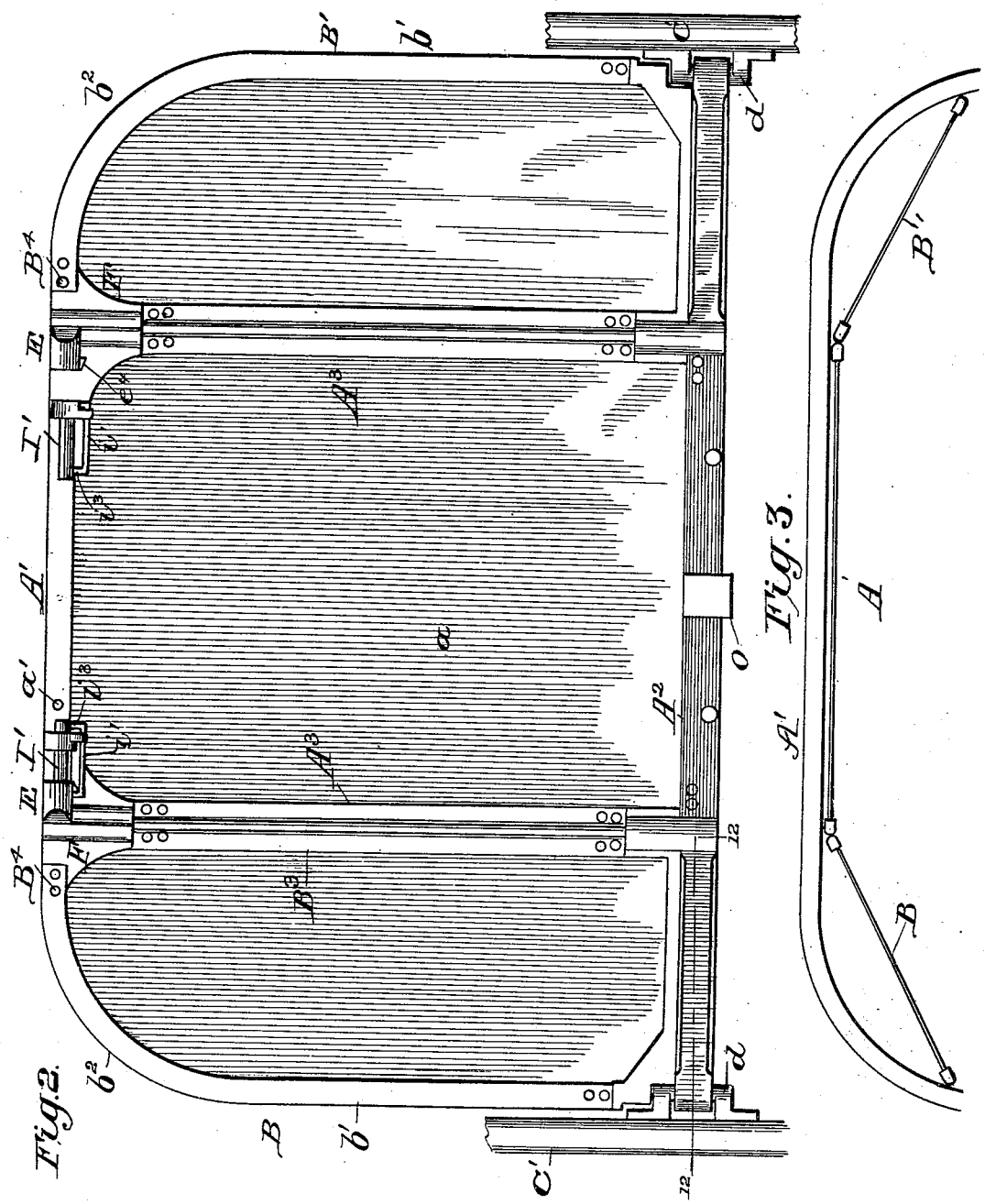

No. 714,016. Patented Nov. 18, 1902.
J. B. McMULLEN.
FRONT FOR VEHICLE TOPS.
(Application filed Apr. 9, 1902.)
(No Model.) 3 Sheets—Sheet 3.
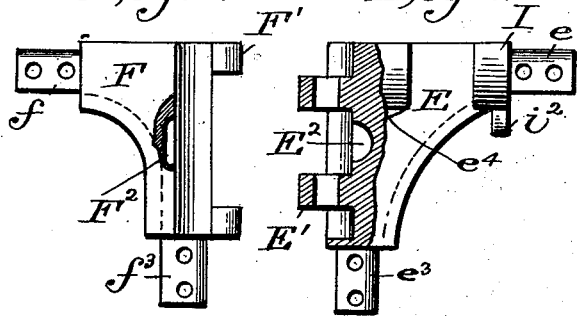
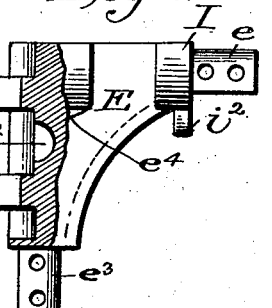
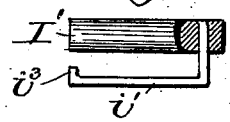
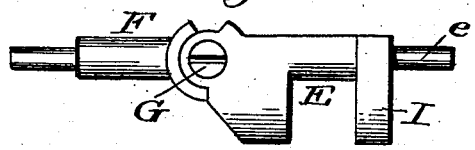
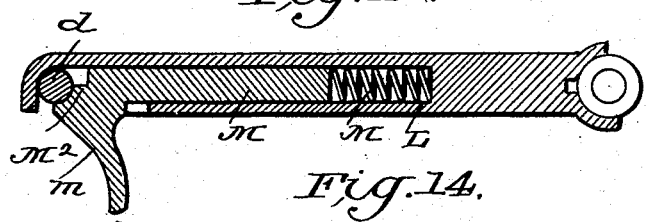
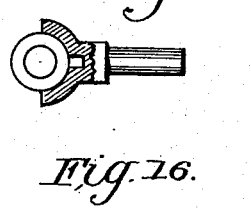
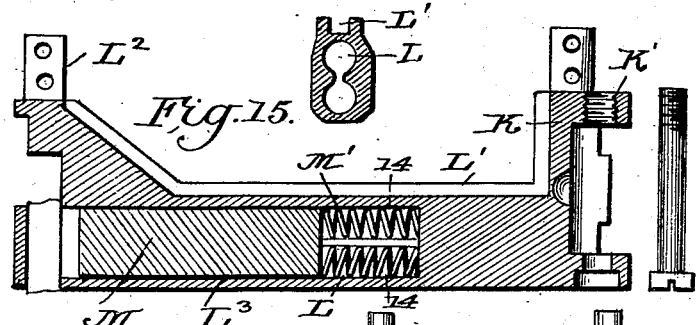
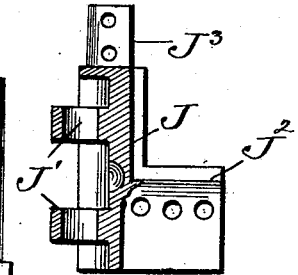
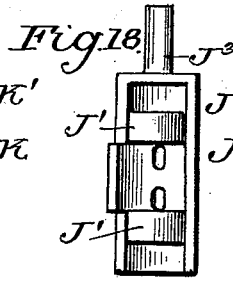
WITNESSES:
Jos. A. Ryan
Perry B. Turpin
INVENTOR
Joseph B. McMullen
BY Munn & Co.
ATTORNEYS

UNITED STATES PATENT OFFICE.

JOSEPH B. McMULLEN, OF HOWARD COUNTY, MARYLAND, ASSIGNOR, BY DIRECT AND MESNE ASSIGNMENTS, TO VEHICLE TOP ATTACHMENT AND PROTECTOR COMPANY, A CORPORATION OF DELAWARE.

FRONT FOR VEHICLE-TOPS.

SPECIFICATION forming part of Letters Patent No. 714,016, dated November 18, 1902.

Application filed April 9, 1902. Serial No. 102,090. (No model.)

*To all whom it may concern:*

Be it known that I, JOSEPH B. MCMULLEN, a citizen of the United States, residing in the county of Howard and State of Maryland, have made certain new and useful Improvements in Fronts for Vehicle-Tops, of which the following is a specification.

My invention is an improvement in fronts for vehicle-tops, such as buggies, automobiles, and the like; and the invention has for an object to provide a novel construction of front which can be conveniently applied to the buggy, will serve to protect the occupants of the buggy when turned down to position for use, and can be conveniently folded up into the top of the vehicle when not in use, the invention being especially applicable to folding tops such as shown in the drawings; and the invention consists in certain novel constructions and combinations of parts, as will be hereinafter described and claimed.

In the drawings, Figure 1 is a vertical longitudinal section of a folding top provided with my improvements. Fig. 2 is a detail elevation of the front, parts of the opposite sides of the bows being shown. Fig. 3 is a front elevation of the upper portion of the top, showing the front folded therein. Fig. 4 is a detail enlarged section showing the upper portion of the front and the front bow and the hinge connection between the front and bow. Fig. 5 is a detail sectional view showing the hook for supporting the front in folded position in connection with the middle bow, a portion of the front being shown. Fig. 6 shows in side view and rear elevation one of the brackets to which the upper edge of the front is hinged. Figs. 7 and 8 are detail views illustrating one of the hinges for connecting the upper edge of the main section with the side sections. Fig. 9 is a detail side view, partly in section, showing the pintle by which the front is hinged to the front bow of the vehicle-top. Fig. 10 is a top plan view illustrating the hinge shown at the left in Fig. 2 for connecting the main section of the front with the side section. Fig. 11 is a detail view of the spring employed in the hinge shown in Fig. 10. Fig. 12 is a detail horizontal section on about the line indicated by line 12 12 on Fig. 2, illustrating the combined latch, base-bar, and hinge-knuckles employed at the swinging edge of the side section of the front shown at the left in Fig. 2. Fig. 13 is a detail sectional view of the hinge-knuckle which coöperates with that shown in Fig. 12 in hinging the side section to the main section of the front. Fig. 14 is a detail cross-section on about line 14 14 of Fig. 15, the springs and sliding bolt being omitted. Fig. 15 is a detail vertical section of the device shown in Fig. 12. Fig. 16 is a detail vertical section of the device shown in Fig. 13; and Figs. 17 and 18 are face views of the hinge-knuckles shown, respectively, in Figs. 15 and 16.

In Figs. 1 and 3 I illustrate the front in place in a folding vehicle-top, while in Fig. 2 I show the front as viewed from within the vehicle-top, the other views showing details employed in carrying out the invention.

The front is composed of the intermediate or main section A, the side sections B B', and the devices for uniting said sections and for securing the same to the buggy-top, and in the different adjustments shown in full lines, Fig. 1, and dotted lines in the same figure. The sections A and B are composed of glass plates and frames fitting the edges of said plates and extending between the hinge devices and latch devices presently described. The buggy-top C has its bows curved transversely at their tops, as shown in Fig. 3, and the front bow C' is provided in its crown with the brackets D, to which the upper edge of the front is hinged, and the sides of said bow C' are provided at $d$ with loops for engagement by the latches at the outer edges of the lower ends of the side sections B and B', as shown in Fig. 2. The side sections B and B' are alike, except that they are rights and lefts, and they are united with the main section A by similar devices, so that the description of the main section in connection with one of the side sections will suffice for an understanding of this feature of the invention.

The main section A is supplied with a frame-strip A' at its upper edge, a frame-strip $A^2$ at its lower edge, and strips $A^3$ at its opposite side edges, these strips being U shape in cross-section to embrace the edges of the glass plate $a$, inclosed in the same, as will be understood from Figs. 4 and 5.

At its ends the frame-strip A' is riveted or otherwise secured at $a'$ upon the shanks $e$, projecting from the hinge-section E, which also has a shank $e^3$, upon which is riveted or otherwise secured the upper edge of the side framestrip $A^3$, as will be understood from Figs. 2, 7, and 8. This hinge-section E has knuckles E', which coöperate with knuckles F' on the hinge-section F and receive the pintle G, (see Fig. 10,) by which the sections E and F are united to form the hinge. The spring H (shown in Fig. 11) is fitted in the knuckles E and F to actuate the hinge and hold the front expanded in the position shown in full lines, Fig. 1, and in Fig. 2 when the front is adjusted for use, and yet permit the folding of the side sections B B' within the top, as shown in Fig. 3.

In Fig. 8 the section E is shown as provided at $E^2$ with a socket, in which is seated the middle portion H' of the spring H, while the section F is shown in Fig. 7 as provided at $F^2$ with a socket to receive the ends $H^2$ of the spring H, so the said spring will properly actuate the hinge, as desired.

The hinge-sections E are provided with lugs I, perforated for the passage of the bolts I', arranged to fit alongside the lugs D' of the brackets D. The bolts I' are slidable in the lugs I into and out of the lugs D', so the front can be readily connected with and disconnected from the front bow. Adjacent to the lug I, I provide a guide-lug $I^2$, having an opening $i^2$, in which slides a spring $i$, secured to the bolt I', as shown in Fig. 9, and provided at its free end with a tongue or projection $I^3$, which in the shot position of the bolt engages a shoulder $e^4$ on the hinge-section E and locks the bolt in position to secure the front to the bow C', as will be understood from Figs. 2, 4, 8, and 9.

The sections B B' are provided with framestrips $B^3$ similar to the strips $A^3$ and with edge frame-strips $b'$, which curve at their upper ends at $B^2$ inwardly and are riveted at their upper ends at $B^4$ to lugs $f$ on the hingesections F, such sections being also provided with lugs or shanks $f^3$, on which the upper ends of the frame-strips $B^3$ are secured by riveting, as shown, or in other suitable manner, as may be desired. By the described construction the front is adapted at its upper end for connection with the bow of the vehicle, and the glass plates are suitably framed, as will be understood from the drawings. At its lower end the main section A is hinged at its opposite edges to the adjacent edges of the side sections, this connection being effected by means of the hinge comprising the hinge-section J, secured to the main section A, and the hinge-section K, secured to the side section. The section J has lugs $J^2$ and $J^3$, to which the frame-strips $A^2$ and $A^3$ are respectively secured, and is also provided with knuckles J', coöperating with the knuckles K' and the pintle in connecting the sections A and B, as will be understood from Figs. 14 and 16.

The side sections B and B' are comparatively narrow, and the lower edges of the glass plates of said sections are framed by the base-strips L, preferably made integral with the hinge-section K, grooved at L' to receive the lower edges of the glass plate, as will be understood from Fig. 15, provided at its outer edge with a lug $L^2$, on which the lower edge of the framing-strip $b'$ is secured, and provided with a socket $L^3$ for the latchbolt M, which engages with the loop $d$ and secures the front in the position for use shown in Fig. 1. The bolt M slides back and forth in the socket-piece L, is actuated by the springs M' at its inner end, and is hooked at its outer end at $M^2$ to engage with the loop $d$, as shown in Fig. 12. The hook $M^2$ is arranged at the front side of the lower edge of the front and is sloped off at $m$ so it will adjust into engagement with the loop $d$ when the front is thrown down in position for use, as shown in Fig. 1. The middle bow $C^2$ of the vehicle is provided at N with a spring-actuated hook, whose actuating-spring N' sets the hook into position to engage with a projection O on the swinging edge of the main section of the front when the said front is thrown to the folded position shown in dotted lines, Fig. 1, and as shown in detail in Fig. 5. The hook N is sloped at $N^2$ to permit the ready passage of the projection O into engagement with the hook, and a spring P cushions between the swinging edge of the main section A and the bow $C^2$, as will be understood from Fig. 5. By this means the front can be thrown quickly up against the bow $C^2$, and when so adjusted will be held by the hook N, as shown in Fig. 5. In so adjusting the front the sections B and B' will adjust to the position shown in Fig. 3, the spring-hinges uniting said sections with the main section permitting such adjustment of the front and also tending to prevent any rattling in the position shown in dotted lines, Fig. 1, this latter result of preventing rattling being aided by the cushioning-spring P and the spring N', which actuates the hook N. It will be understood that in practice the framing-strips for the edges of the glass plates of the sections A, B, and B' may be covered with leather or otherwise finished, as desired.

Having thus described my invention, what I claim as new, and desire to secure by Letters Patents, is—

1. The combination with the top having the front and middle bows and provided on the middle bow with a hook N and cushion P, on the front bow with the loops $d$ and the hingeknuckles D, the front composed of the main section, the side sections, and the springhinges uniting said sections, the hingeknuckles and bolts at the upper edge of the main section for connection with the lugs of the front bow, and the hooks at the lower edges of the side sections, for engagement with the loops on the front bow, substantially as and for the purposes set forth.

2. The combination with the main sections and the side sections, of the hook-bolts for securing the side sections in position for use, and the casings for said bolts provided with sockets for the bolts and having at their inner ends hinge-knuckles for connection with the mating knuckles of the main section, and provided at the inner and outer edges of said bolt-casing with lugs or shanks for connection with the framing-strips of the side sections, and the said framing-strips, substantially as and for the purposes set forth.

3. The combination with the vehicle-top having the downwardly-curved sides, of the front having the main section hinged at its upper end to the top and arranged to fold upwardly within the said top, and the side sections hinged at their inner edges to the outer edges of the main section whereby they may adjust to conform to the transverse curvature of the top when folded thereinto, the hinges between the main and side sections being provided with springs whereby to hold the parts under tension and prevent rattling when the sectional front is adjusted into the top substantially as set forth.

JOSEPH B. McMULLEN.

Witnesses:
J. MIDDLETON,
PERRY B. TURPIN.